(12) United States Patent
Uchiyama et al.

(10) Patent No.: US 6,772,287 B2
(45) Date of Patent: *Aug. 3, 2004

(54) STORAGE CONTROL UNIT AND STORAGE SYSTEM

(75) Inventors: Yoshihiro Uchiyama, Odawara (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 10/167,810

(22) Filed: Jun. 11, 2002

(65) Prior Publication Data

US 2003/0005220 A1 Jan. 2, 2003

Related U.S. Application Data

(63) Continuation of application No. 09/397,560, filed on Sep. 16, 1999, now Pat. No. 6,408,358.

(30) Foreign Application Priority Data

Dec. 24, 1998 (JP) .......................................... 10-366343

(51) Int. Cl.[7] .......................... G06F 12/00; G06F 13/00; G06F 11/16
(52) U.S. Cl. ........................................... 711/114; 714/6
(58) Field of Search .................. 714/5–6; 711/111–114, 711/162, 4; 370/223–224, 228; 710/100

(56) References Cited

U.S. PATENT DOCUMENTS

| | | | |
|---|---|---|---|
| 5,463,765 A | 10/1995 | Kakuta et al. ............... 714/769 |
| 5,729,763 A | 3/1998 | Leshem ........................ 710/38 |
| 5,757,642 A * | 5/1998 | Jones ............................ 714/4 |
| 5,812,754 A | 9/1998 | Lui et al. ....................... 714/6 |
| 5,841,997 A | 11/1998 | Bleiweiss et al. ........... 710/131 |
| 5,867,640 A * | 2/1999 | Aguilar et al. ................ 714/6 |
| 6,148,414 A * | 11/2000 | Brown et al. .................. 714/9 |
| 6,192,027 B1 | 2/2001 | El-Batal ..................... 370/222 |
| 6,330,687 B1 | 12/2001 | Griffith ......................... 714/6 |
| 6,408,358 B1 * | 6/2002 | Uchiyama et al. .......... 711/114 |

* cited by examiner

Primary Examiner—Denise Tran
(74) Attorney, Agent, or Firm—Townsend and Townsend and Crew LLP

(57) ABSTRACT

A structure of control units and storage units is provided in which, if a port for connecting the storage units fails, any storage unit in a plurality of storage unit groups can be accessed from one control unit. Specifically, a distinctively arranged structure is provided in which dual paths are provided, with each path connected to a plurality of storage unit groups, whereby, in normal operation, dual paths are used as data transfer paths to allow faster access. When a port or path failure occurs, the dual paths allow RAID functions to be maintained.

4 Claims, 3 Drawing Sheets

STORAGE CONTROL UNIT AND STORAGE SYSTEM

CROSS REFERENCE TO RELATED APPLICATION

This is a continuation of U.S. application Ser. No. 09/397,560, filed Sep. 16, 1999, now U.S. Pat. No. 6,408,358.

BACKGROUND OF THE INVENTION

The present invention is related to a storage control unit which is connected between a host unit, and a storage unit such as an external RAID unit, and controls data transfer between the host unit and the RAID or other external storage unit. In particular, the present invention is related to a storage system which has a distinctive structure for connecting the storage control unit and the external storage unit.

The host unit can include a plurality of host computers or a single host computer with a plurality of ports, and the external storage unit includes a plurality of individual storage units, for example, such as hard disk drives.

With the increasing scale of computer storage systems, faster data processing, and increasing amounts of data, it is necessary for a storage control unit to have improved performance, reliability and availability. Typically, to improve reliability in a storage control unit, redundant components and connections are used. For example, a plurality of controllers or a plurality of ports is provided.

FIGS. 2 and 3 are examples of connections between a storage control unit and a storage unit. As shown in those figures, the storage control unit has a plurality of control units in communication with dual port structures, and is arranged such that two SCSI access paths from each control unit are connected to the storage units. In the figures, SCSI is an abbreviation of Small Computer System Interface and means an input/output interface comprising SCSI-1 and SCSI-2 where SCSI-1 and SCSI-2 have the same well known specifications, but SCSI-2 also takes into consideration a system in which SCSI-1 units and SCSI-2 units are both used. When it is unnecessary to distinguish SCSI-1 and SCSI-2, SCSI-1 or just SCSI, is used as a general term.

Another way of improving performance and availability is to use optical fiber channel technology to replace SCSI-1. For example, a technology which uses an optical fiber channel to connect a storage control unit to storage units is disclosed in Japanese patent publication 5-241984. As known from the prior art, all these technologies use an optical fiber channel to connect a storage control unit and a host computer. As such, no description of this type of connection is necessary here. Moreover, equipment in which a storage control unit is connected to a storage unit through an optical fiber channel has been introduced as a product. See the disk array system FC5000 made by Data General Corporation.

The conventional means of providing dual access paths between a control unit and storage units is to employ a storage unit which has a plurality of input/output ports (e.g., a dual port magnetic disk device, a dual port magnetic disk unit or other multi-port storage units) so that two access paths are provided in one control unit. When either path fails, the other path is used as the access path.

In a conventional connection structure between a storage control unit and multiple storage units, when trouble occurs on one path (for example, when SCSI-1 port 1-1 breaks down in FIG. 2), access to the storage units connected to the failed path can be executed only through one path from SCSI-1 port 1-2; therefore, concurrent access from the control unit 1 to multiple storage units connected to the failed path through a dual path route is impossible. This means that a function using two data paths generally cannot be used in a mode in which a data transfer operation has priority and in which the dual paths are not continually provided.

In FIG. 3, when SCSI-1 port 1-1 fails, control unit 1 cannot access all the disk units connected to SCSI-1 port 1-1. As a result, access to a target disk unit is executed by control unit 2 which must process it through other communication means.

Similarly, if both paths break down (for example, when SCSI-1 port 1-1 and SCSI-1 port 1-2 break down in FIG. 2), the control unit 1 cannot access all the storage units connected to SCSI-1 port 1-1 and SCSI-1 port 1-2. As a result, access to a target disk unit is executed by control unit 2 which must process it through other communication means (not shown). Thus, when a path breaks down, access to a target disk cannot be executed, communication processing between control units is required, and performance deteriorates.

Further, if the dual access paths are made merely by providing two ports for connecting storage units using fiber channel control chips, etc., manufacturing cost increases. On the other hand, if a system uses one access path, a data transfer operation between the control unit and a plurality of storage units connected to this path that executes primarily by accessing two paths at the same time, cannot be performed and system performance deteriorates.

SUMMARY OF THE INVENTION

One objective of the present invention is to provide a system structure where, in normal operation, distinctively constructed dual paths are used as data transfer paths to enable faster access and, when a path failure occurs, to allow continued access to data. The benefit of a dual path structure is provided and manufacturing cost is decreased.

The present invention provides a system structure for a storage control unit having a plurality of control units, where even if a failure occurs on a path between the control unit and the storage units, the control unit itself can still access the target storage unit, minimizing the need to request another control unit to execute the processing. Another benefit of the present invention is that it provides a system structure in which access to a storage unit is processed with distributed access load in the control unit. According to the present invention, these objectives are accomplished by providing a storage control unit that has at least two control units, each of which has a plurality of connecting ports for connecting a plurality of storage units to the control units that manage them. Moreover, a storage control unit is connected to an external storage unit, by a connecting structure in which a connecting port in a first control unit is connected by an access path (transfer path) to a connecting port in a second control unit, and a second connecting port in the first control unit is connected by another access path to a second connecting port in said second control unit. The two paths are connected to a storage unit, and a plurality of such storage units are used. The storage unit includes a magnetic disk unit having a dual port input/output function.

Furthermore, in the structure described above, the present invention provides a connecting structure in which a plurality of storage units connected to the two paths are specified as one group, and striping for a RAID structure is executed in this group. Although RAID means Redundant Array of Independent Disks, it does not necessarily mean a Redundant Array comprising independent disks. RAID systems refers to an external storage system which has a disk array structure of RAID.

A first embodiment of the above-described structure is shown in FIG. 1, in which each storage unit is connected to two parallel, vertical fiber channel loops, each row is a communicating group, and the plurality of groups are vertically arranged. The present invention provides a storage control unit that has at least two control units, each having a plurality of connecting ports for connecting a plurality of storage units to the control units managing these storage units, and each having a connecting structure between a storage control unit and an external storage unit, such that the first connecting port in the first control unit is connected by a fiber channel loop to the first connecting port in a second control unit, a second connecting port in the first control unit is connected by a second fiber channel loop to a second connecting port in the second control unit, the two fiber channel loops are connected to the first storage unit, and a plurality of such storage units is used.

A second embodiment of the present invention provides a storage control unit which has at least two control units, each having a plurality of connecting ports for connecting a plurality of storage units to the control units managing these storage units, and each having a connecting structure between a storage control unit and an external storage unit, such that the first connecting port in the first control unit is connected by a SCSI-1 path to the first connecting port in a second control unit, a second connecting port in the first control unit is connected by a second SCSI-1 path to a second connecting port in said second control unit, the two SCSI-1 paths are connected to the first storage unit, and a plurality of such storage units is used.

Furthermore, in the first embodiment, the present invention provides a connecting structure in which a plurality of storage units connected to the two fiber channel loops are specified as one group, and striping for a RAID structure is executed in this group. In the second embodiment, the present invention provides a connecting structure in which a plurality of storage units connected to said two SCSI-1 paths are specified as one group, and striping for a RAID structure is executed in this group.

DESCRIPTION OF THE SPECIFIC EMBODIMENTS

Figure 1:
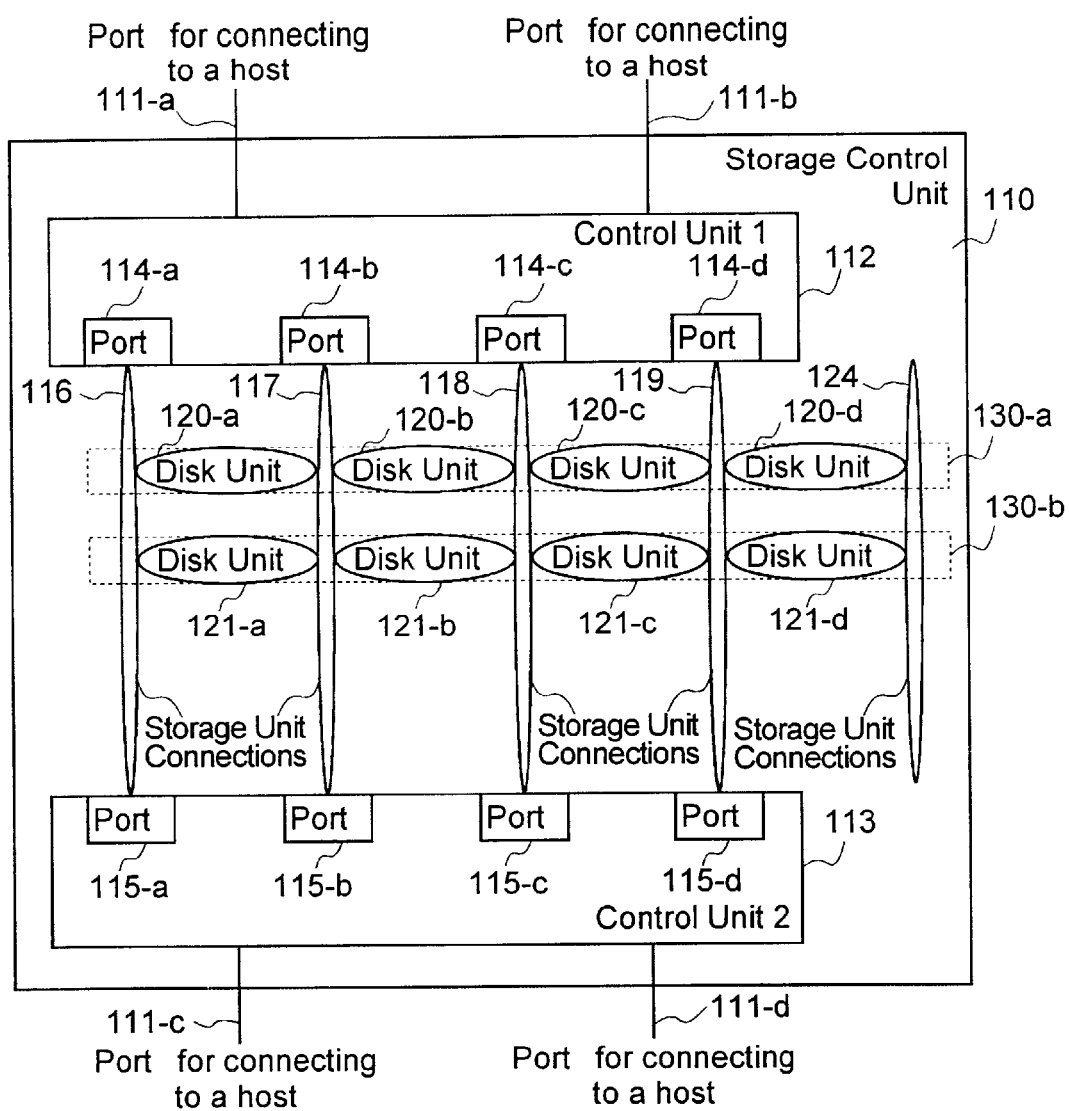
FIG. 1 is a block diagram of an embodiment of the present invention, which shows the structure of the storage control unit in which the storage units are connected to the control units with fiber channel loops.
Figure 2:
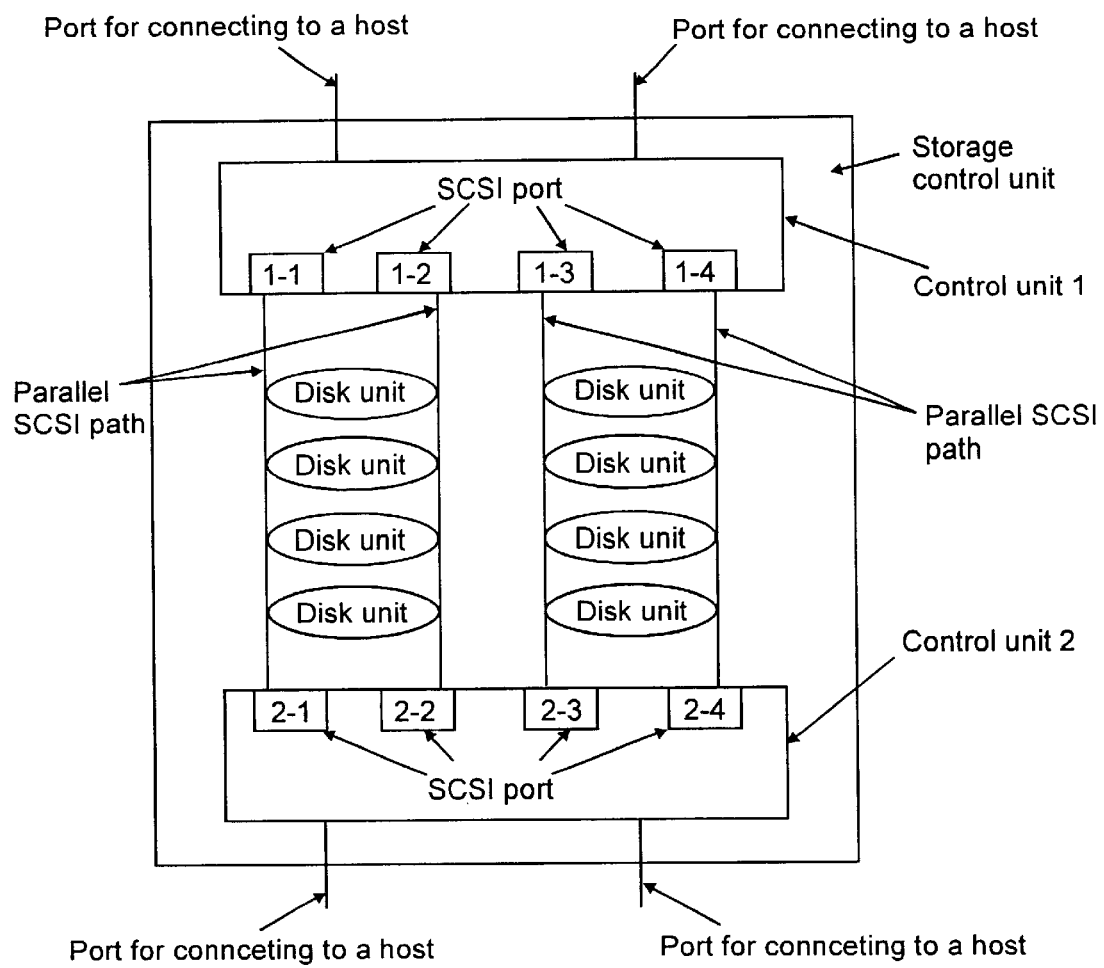
FIG. 2 is a block diagram showing an example of a conventional dual-path structure which connects storage units to control units by SCSI paths.
Figure 3:
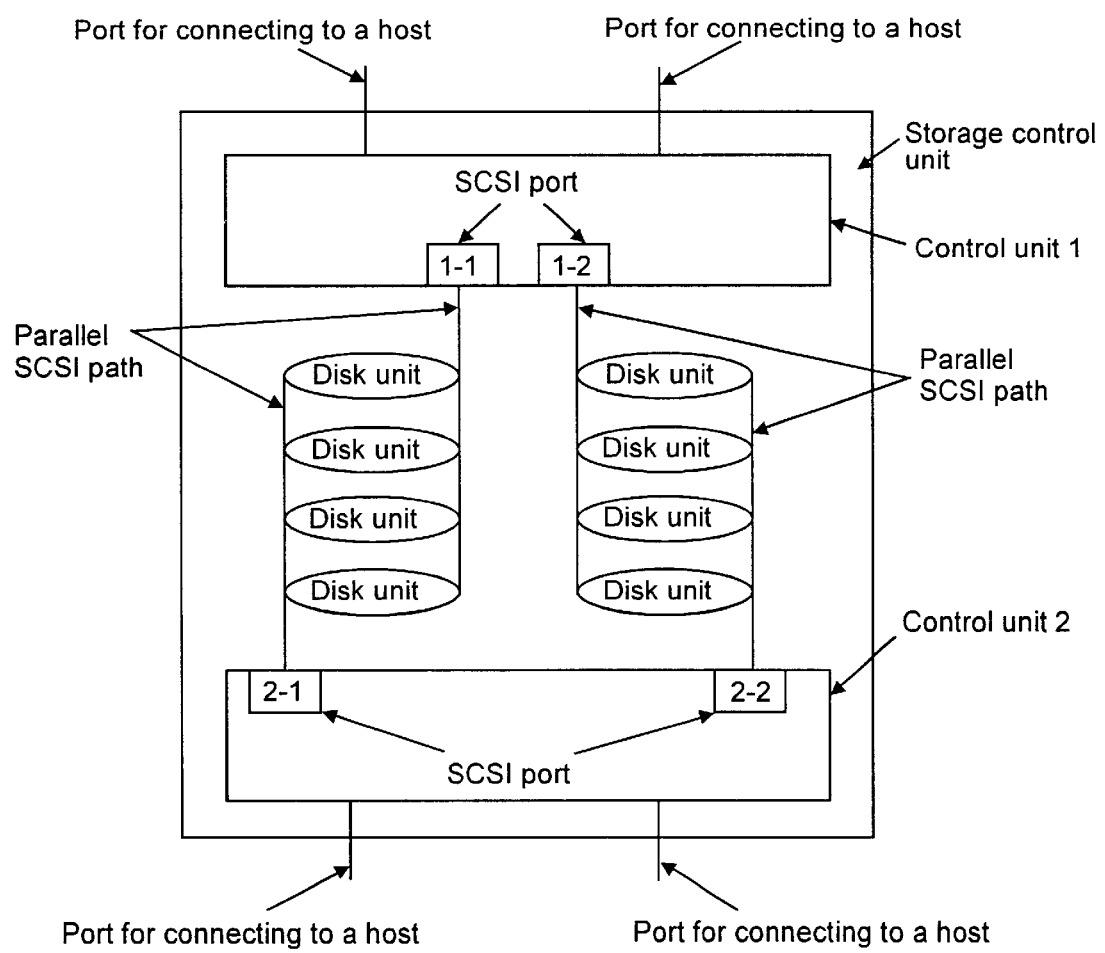
FIG. 3 is a block diagram showing another example of a conventional dual-path structure which connects storage units to control units by SCSI paths.

Embodiments of the present invention are disclosed with reference to FIG. 1. FIG. 1 shows an example of the structure of a storage control unit having two control units. This structure can be applied to storage control units having an even number of control units.

The external storage unit 110 comprises storage units (a dual port magnetic disk device, a dual port magnetic disk unit or other multi-port storage units, etc.) from 120-*a* to 120-*d* and from 121-*a* to 121-*d*, and two control units 112, 113 which control these storage units. For purposes of illustration, only two RAID storage unit groups 130-*a* and 130-*b* are shown in FIG. 1, but the invention is not limited to this number.

The control units 112, 113 are equipped with ports 111-*a*, 111-*b*, 111-*c*, 111-*d* for connection to a host computer(s) through a SCSI bus or other data transfer path (access path). Moreover, the control units 112, 113 are also equipped with ports 114-*a* through 114-*d* and 115-*a* through 115-*d* for connecting storage units 120-*a* through 120-*d* and 121-*a* through 121-*d*. The ports 114-*a* through 114-*d* and 115-*a* through 115-*d* preferably are composed of fiber channel control chips, through which the storage units 120-*a* through 120-*d* and 121-*a* through 121-*d* are connected. Instead of the fiber channel control chip, a SCSI control chip may be used for a SCSI structure. The chip is an integrated circuit which provides an electronic control circuit.

Although the invention can use some fiber channel control chips, each of which supports a function of class 1 through class 4 and an intermix of such functions (described below), the present invention relates to the dual structure of the physical transfer path and the effect of the present invention is attained whether or not a function is provided independently of the function supported by the fiber channel control chip.

Class 1 is a connection function in which a communication path is dedicated prior to data transfer and is adequate for point-to-point topology. Class 2 and class 3 are connectionless functions in which data is divided into several kilobytes, at maximum, and a header containing the divided data address is transferred. Class 2 and class 3 are adequate for such loop topology as FC AL (Fiber Channel-Arbitrated Loop). Because division of data is allowed and the data structure has an address-bearing header, class 2 and class 3 are adequate for data transfer in the back-end of a RAID-based setup (transfer between a control unit and a storage unit). In class 2, after arrival of the previous data is confirmed, the next data is transferred, but in class 3, this step is omitted. If a storage unit having a command queue function is used, the control chip of class 3 is suitable for an embodiment of the present invention.

In intermix, when the bandwidth of the communication channel connected in class 1 has a margin, an operation in which the marginal bandwidth is allocated to class 2 or class 3 is executed. In class 4, a Quality of Service function (QOS) in which bandwidth is dedicated to multimedia transfer is realized. In class 4 a plurality of virtual channels can be set on a physical channel, but QOS differs from the present invention in that the present invention realizes the dual paths through a plurality of physical channels.

In the storage control unit 110 having the structure described above, storage units 120-*a* through 120-*d* and 121-*a* through 121-*d* are connected to control units 112, 113 by fiber channels as follows. Fiber channel control chip 114-*a* is connected to fiber channel control chip 115-*a* through a fiber channel loop 116. Similarly, fiber channel control chips 114-*b*, 114-*c* and 114-*d* are connected to fiber channel control chips 115-*b*, 115-*c* and 115-*d* through fiber channels 117, 118 and 119, respectively. Storage units are connected between the channels, for example, units 120-*a* and 120-*b* are connected through fiber channel loops 116 and 117. Fiber channel loop 124 is the same as loop 116, illustrating the connection of storage units in loops.

Similarly, storage units 120-*b* and 121-*b* are connected to fiber channel loops 117 and 118, storage units 120-*c* and 121-c are connected to fiber channel loops 118 and 119, and storage units 120-d and 121-d are connected to fiber channel loops 119 and 124. Fiber channel loop 124 is the same as fiber channel loop 116.

In FIG. 1, in the example of storage units 120-a and 121-a, a storage unit group, which is horizontally arranged, may be connected to any two loops among the fiber channel loops 116, 117, 118, 119, and 124/116 in the embodiment of FIG. 1; therefore, it is necessary that the storage unit be connected to parallel loops.

In the storage control unit 110 described above, a group comprising storage units 120-a, 120-b, 120-c, and 120-d wherein each storage unit is connected to different fiber channel loop, is identified as RAID group 130-a. Similarly, a group comprising storage units 121-a, 121-b, 121-c, and 121-d is identified as RAID group 130-b. Data is divided and stored in the storage units in the above-defined RAID groups.

In a RAID system, data is divided (striping) into a plurality of specified data units (slots); then, when the data is accessed by a host unit, multiple access procedures are needed to retrieve data from the storage units. For example, when the long data is read out, the data is usually stored in a plurality of storage units. When new data is written over old data (updated), parity data is needed in addition to the separately striped write data, and the parity data is usually stored in a different storage unit from the one storing the striped data. When access to such data is required, the connecting structure described above is effective.

Next is a description of storage control unit 110 when the storage control unit has received a command for processing demand (hereinafter processing demand) from a host computer. As an example, when the storage control unit receives a write demand to storage unit 120-a through port 111-a, the control unit 112 receives the processing demand.

The control unit 112 manages the storage unit (assumed to be storage unit 120-b here) in which is stored the parity data corresponding to the write data to be stored in the storage unit 120-a. Moreover, control unit 112 also directs that storage unit 120-a can be accessed through the two ports 114-a and 114-b, and storage unit 120-b can be accessed through the two ports 114-b and 114-c.

When the control unit 112 intends to access to storage unit 120-a or 120-b, the control unit preferably calculates the load of each port (the extent of processing required to access the storage unit through the port), then selects the port having the smallest load, and accesses the storage unit through that port. If either of the two ports connected to a storage unit has failed, the access is executed from the remaining functional port. If both of the ports have failed, control unit 113 is asked to execute the processing demand through another path, such as a communication means between the control units, and access to the storage unit 120-a or 120-b is executed.

When control unit 113 receives a processing request, it executes access to storage unit 120-a or 120-b in a similar way to the procedure described for control unit 112. If three ports 115-a, 115-b, 115-c have failed in control unit 113, access to storage unit 120-a or 120-b cannot be executed, and the host computer sends an error message in response to the processing demand.

In the embodiment of FIG. 1, control unit 112 can use a first path through fiber channel control chip 114-a and fiber control loop 116 to access target storage unit 120-a. Furthermore, a second path through fiber channel control chip 114-b and fiber channel loop 117 also can be used.

Control unit 112 can use a first path through fiber control channel chip 114-b and fiber channel loop 117 to access target storage unit 120-b. Furthermore, a second path through fiber channel control chip 114-c and fiber channel loop 118 also can be used.

It should be noted that in FIG. 1 a storage unit is connected to two parallel fiber channel loops; therefore, at least two different paths are allocated to each storage unit. Because of this arrangement, even when one path has failed, the target storage unit can be accessed from control unit 112 through the remaining functional path.

Further, even when failures occur in two paths, for example in the fiber channel control chips 114-a and 114-c, control unit 112 can access the target storage unit through the path connected to fiber channel control chip 114-b. That is, in the connecting structure presented in FIG. 1, even when failures have occurred in two nonconsecutive paths, if a functional path exists between these failed paths, the target storage unit can be accessed through this functional path.

When failures have occurred in both paths to a target storage unit, for example, in both paths connected to fiber channel control chips 114-a and 114-b, there is no functional path from control unit 112 to storage unit 120-a, so access is executed by control unit 113 through a communication means between control unit 112 and control unit 113. Accordingly, a host computer is connected to both control unit 112 and control unit 113.

The connecting structure of the present invention can also be realized by using a SCSI bus instead of the fiber channel loop connecting the storage units to the control unit. An embodiment using the SCSI bus is described next. Control chips 114-a through 114-d and 115-a through 115-d are SCSI control chips. Other components are the same as those in the embodiment using the fiber channel control chip. However, the path need not be a loop.

Storage units 120-a through 120-d and 121-a through 121-d are connected to control units 112 and 113 by a SCSI bus as follows. SCSI control chip 114-a is connected to SCSI control chip 115-a by SCSI bus 116. Similarly, SCSI control chips 114-b, 114-c, 114-d are connected to SCSI control chips 115-b, 115-c, 115-d by SCSI buses 117, 118, 119, respectively. Using the SCSI bus described above, storage units 120-a and 120-b are connected to SCSI buses 116 and 117, storage units 120- and 121-b are connected to SCSI buses 117 and 118, storage units 120-c and 121-c are connected to SCSI buses 118 and 119, and storage units 120-d and 121-d are connected to SCSI buses 119 and 124. SCSI bus 124 is the same as SCSI bus 116.

In the embodiment of FIG. 1, a storage unit 120-a, 121-a, etc., belonging to a storage unit group which is horizontally aligned, may be connected to any two of the SCSI buses 116, 117, 118, 119, 124/116. The storage unit need not be connected to consecutively positioned buses. The embodiment of FIG. 1 describes a control unit having four fiber channel control chips or four SCSI control chips; however, the control unit of the present invention may have any number of fiber channel control chips or SCSI control chips. As described above, the path between the control unit and the storage unit is a dual path according to the present invention, and the path is used in common by the storage units: therefore, the effect of the dual paths can b obtained without increase of path.

Furthermore, when the above-mentioned path structure in which the dual paths are formed and used in common is applied to an external storage unit (storage units corresponding to a RAID group), the effect of the RAID arrangement/ structure is such that if a failure has occurred in a storage unit that is a component of the RAID group, the data can be recovered, can be made redundant while maintaining reliability and without increasing the number of paths. Furthermore, two access paths are connected to a storage unit by two control units and from each control unit; therefore, an effect that an access to a storage unit is processed with dispersing load of access generated in the control unit, can be obtained.

The preceding has been a description of the preferred embodiment of the invention. It will be appreciated that deviations and modifications can be made without departing from the scope of the invention, which is defined by the appended claims.

What is claimed is:

1. A data storage system comprising:

one or more groups of storage units;

a first storage control unit having a plurality of first connecting ports and one or more first host port;

a second storage control unit having a plurality of second connecting ports and one or more second host ports; and a plurality of access paths, each access path having a connection between one of said first connecting ports and one of said second connecting ports, each storage unit in one of said groups having a connection to a pair of said access paths different from other storage units in said one of said groups, each said access path having a connection to exactly two of said storage units in said one of said groups.

2. The data storage system of claim 1 wherein said access paths are fiber channels.

3. The data storage system of claim 1 wherein said access paths are SCSI paths.

4. The data storage system of claim 1 wherein said access paths are exclusive of said storage units.

* * * * *